United States Patent
Bushey et al.

(10) Patent No.: US 7,027,586 B2
(45) Date of Patent: Apr. 11, 2006

(54) INTELLIGENTLY ROUTING CUSTOMER COMMUNICATIONS

(75) Inventors: Robert R. Bushey, Cedar Park, TX (US); Benjamin A. Knott, Round Rock, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 139 days.

(21) Appl. No.: 10/737,921

(22) Filed: Dec. 18, 2003

(65) Prior Publication Data

US 2005/0135595 A1    Jun. 23, 2005

(51) Int. Cl.
    *H04M 3/00* (2006.01)
(52) U.S. Cl. .............. 379/265.09; 379/265.13
(58) Field of Classification Search ........... 379/265.12
    See application file for complete search history.

(56) References Cited

U.S. PATENT DOCUMENTS

| | | | |
|---|---|---|---|
| 4,310,727 A | 1/1982 | Lawser | |
| 4,694,483 A | 9/1987 | Cheung | |
| 4,761,542 A | 8/1988 | Kubo et al. | |
| 4,922,519 A | 5/1990 | Daudelin | |
| 4,930,077 A | 5/1990 | Fan | |
| 4,964,077 A | 10/1990 | Eisen et al. | |
| 5,115,501 A | 5/1992 | Kerr | |
| 5,181,259 A | 1/1993 | Rorvig | |
| 5,204,968 A | 4/1993 | Parthasarathi | |
| 5,206,903 A | 4/1993 | Kohler et al. | |
| 5,263,167 A | 11/1993 | Conner, Jr. et al. | |
| 5,299,260 A | 3/1994 | Shaio | |
| 5,311,422 A | 5/1994 | Loftin et al. | |
| 5,323,452 A | 6/1994 | Dickman et al. | |
| 5,327,529 A | 7/1994 | Fults et al. | |
| 5,335,268 A | 8/1994 | Kelly, Jr. et al. | |
| 5,335,269 A | 8/1994 | Steinlicht | |
| 5,371,673 A | 12/1994 | Fan | |
| 5,388,198 A | 2/1995 | Layman et al. | |
| 5,420,975 A | 5/1995 | Blades et al. | |
| 5,479,488 A | 12/1995 | Lennig et al. | |
| 5,493,608 A | 2/1996 | O'Sullivan | |
| 5,495,567 A | 2/1996 | Iizawa et al. | |
| 5,500,795 A | 3/1996 | Powers et al. | |
| 5,519,772 A | 5/1996 | Akman et al. | |
| 5,530,744 A | 6/1996 | Charalambous et al. | |
| 5,533,107 A | 7/1996 | Irwin et al. | |
| 5,535,321 A | 7/1996 | Massaro et al. | |

(Continued)

FOREIGN PATENT DOCUMENTS

WO        00/33548        6/2000

(Continued)

OTHER PUBLICATIONS

A. Kellner et al., "PADIS—An Automatic Telephone Switchboard and Directory Information System,", *Speech Communication* Oct. 1997.

(Continued)

*Primary Examiner*—Creighton Smith
(74) *Attorney, Agent, or Firm*—Greenblum & Bernstein, P.L.C.

(57) ABSTRACT

A method for intelligently routing customer communications to an agent includes receiving a customer's request to initiate communications. A modality of the requested communications is identified and a profile of the customer is obtained. An agent model is generated for each modality supported by each agent. An agent model is selected from a set of agent models for each of a set of agents, based upon the identified modality. The profile of the customer is compared with the selected model for each of the set of agents to determine a best match. A communications connection is established between the customer and the best matched agent.

21 Claims, 5 Drawing Sheets

U.S. PATENT DOCUMENTS

| | | |
|---|---|---|
| 5,537,470 A | 7/1996 | Lee |
| 5,553,119 A | 9/1996 | McAllister et al. |
| 5,561,711 A | 10/1996 | Muller |
| 5,566,291 A | 10/1996 | Boulton et al. |
| 5,586,060 A | 12/1996 | Kuno et al. |
| 5,586,171 A | 12/1996 | McAllister et al. |
| 5,586,219 A | 12/1996 | Yufik |
| 5,594,791 A | 1/1997 | Szlam et al. |
| 5,600,781 A | 2/1997 | Root et al. |
| 5,615,323 A | 3/1997 | Engel et al. |
| 5,633,909 A | 5/1997 | Fitch |
| 5,657,383 A | 8/1997 | Gerber et al. |
| 5,659,724 A | 8/1997 | Borgida et al. |
| 5,668,856 A | 9/1997 | Nishimatsu et al. |
| 5,671,351 A | 9/1997 | Wild et al. |
| 5,675,707 A | 10/1997 | Gorin et al. |
| 5,683,872 A | 11/1997 | Flockhart et al. |
| 5,684,870 A | 11/1997 | Maloney et al. |
| 5,706,334 A | 1/1998 | Balk et al. |
| 5,710,884 A | 1/1998 | Dedrick et al. |
| 5,727,950 A | 3/1998 | Cook et al. |
| 5,729,600 A | 3/1998 | Blaha et al. |
| 5,734,709 A | 3/1998 | DeWitt et al. |
| 5,740,549 A | 4/1998 | Reilly et al. |
| 5,757,644 A | 5/1998 | Jorgensen et al. |
| 5,758,257 A | 5/1998 | Herz et al. |
| 5,771,276 A | 6/1998 | Wolf |
| 5,790,117 A | 8/1998 | Halviatti et al. |
| 5,793,368 A | 8/1998 | Beer |
| 5,802,526 A | 9/1998 | Fawcett et al. |
| 5,806,060 A | 9/1998 | Borgida et al. |
| 5,808,908 A | 9/1998 | Ghahramani |
| 5,809,282 A | 9/1998 | Cooper et al. |
| 5,812,975 A | 9/1998 | Komori et al. |
| 5,819,221 A | 10/1998 | Kondo et al. |
| 5,821,936 A | 10/1998 | Shaffer et al. |
| 5,822,397 A | 10/1998 | Newman |
| 5,822,744 A | 10/1998 | Kesel |
| 5,825,856 A | 10/1998 | Porter et al. |
| 5,825,869 A | 10/1998 | Brooks et al. |
| 5,832,428 A | 11/1998 | Chow et al. |
| 5,832,430 A | 11/1998 | Lleida et al. |
| 5,835,565 A | 11/1998 | Smith et al. |
| 5,848,396 A | 12/1998 | Gerace |
| 5,864,605 A | 1/1999 | Keshav |
| 5,864,844 A | 1/1999 | James et al. |
| 5,870,308 A | 2/1999 | Dangelo et al. |
| 5,872,865 A | 2/1999 | Normile et al. |
| 5,873,068 A | 2/1999 | Beaumont et al. |
| 5,884,029 A | 3/1999 | Brush, II et al. |
| 5,899,992 A | 5/1999 | Iyer et al. |
| 5,903,641 A | 5/1999 | Tonisson |
| 5,905,774 A | 5/1999 | Tatchell et al. |
| 5,920,477 A | 7/1999 | Hoffberg et al. |
| 5,923,745 A | 7/1999 | Hurd |
| 5,943,416 A | 8/1999 | Gisby |
| 5,953,406 A | 9/1999 | LaRue et al. |
| 5,963,965 A | 10/1999 | Vogel |
| 5,974,253 A | 10/1999 | Nahaboo et al. |
| 5,991,735 A | 11/1999 | Gerace |
| 5,999,611 A | 12/1999 | Tatchell et al. |
| 5,999,908 A | 12/1999 | Abelow |
| 6,014,638 A | 1/2000 | Burge et al. |
| 6,016,336 A | 1/2000 | Hanson |
| 6,026,381 A | 2/2000 | Barton, III et al. |
| 6,032,129 A | 2/2000 | Greef et al. |
| 6,035,283 A | 3/2000 | Rofrano |
| 6,035,336 A | 3/2000 | Lu et al. |
| 6,038,560 A | 3/2000 | Wical |
| 6,044,146 A * | 3/2000 | Gisby et al. ........... 379/266.02 |
| 6,044,355 A | 3/2000 | Crockett et al. |
| 6,055,542 A | 4/2000 | Nielsen et al. |
| 6,058,163 A | 5/2000 | Pattison et al. |
| 6,058,179 A | 5/2000 | Shaffer et al. |
| 6,058,435 A * | 5/2000 | Sassin et al. ............... 719/331 |
| 6,061,433 A | 5/2000 | Polcyn et al. |
| 6,067,538 A | 5/2000 | Zorba et al. |
| 6,088,429 A | 7/2000 | Garcia |
| 6,099,320 A | 8/2000 | Papadopoulos |
| 6,104,790 A | 8/2000 | Narayanaswami |
| 6,128,380 A | 10/2000 | Shaffer et al. |
| 6,134,315 A | 10/2000 | Galvin |
| 6,134,530 A | 10/2000 | Bunting et al. |
| 6,148,063 A | 11/2000 | Brennan et al. |
| 6,157,808 A | 12/2000 | Hollingsworth |
| 6,160,877 A | 12/2000 | Tatchell et al. |
| 6,163,607 A | 12/2000 | Bogart et al. |
| 6,166,732 A | 12/2000 | Mitchell et al. |
| 6,170,011 B1 | 1/2001 | Macleod Beck et al. |
| 6,173,053 B1 | 1/2001 | Bogart et al. |
| 6,173,279 B1 | 1/2001 | Levin et al. |
| 6,201,948 B1 | 3/2001 | Cook et al. |
| 6,212,502 B1 | 4/2001 | Ball et al. |
| 6,219,665 B1 | 4/2001 | Shiomi |
| 6,230,197 B1 | 5/2001 | Beck et al. |
| 6,236,955 B1 | 5/2001 | Summers |
| 6,236,990 B1 | 5/2001 | Geller et al. |
| 6,243,375 B1 | 6/2001 | Speicher |
| 6,249,579 B1 | 6/2001 | Bushnell |
| 6,263,052 B1 | 7/2001 | Cruze |
| 6,269,153 B1 | 7/2001 | Carpenter et al. |
| 6,278,976 B1 | 8/2001 | Kochian |
| 6,282,404 B1 | 8/2001 | Linton |
| 6,289,084 B1 | 9/2001 | Bushnell |
| 6,292,909 B1 | 9/2001 | Hare |
| 6,295,551 B1 | 9/2001 | Roberts et al. |
| 6,296,376 B1 | 10/2001 | Kondo et al. |
| 6,308,172 B1 | 10/2001 | Agrawal et al. |
| 6,330,326 B1 | 12/2001 | Whitt |
| 6,332,154 B1 | 12/2001 | Beck et al. |
| 6,336,109 B1 | 1/2002 | Howard |
| 6,349,290 B1 | 2/2002 | Horowitz et al. |
| 6,353,661 B1 | 3/2002 | Bailey, III |
| 6,353,825 B1 | 3/2002 | Ponte |
| 6,357,017 B1 | 3/2002 | Bereiter et al. |
| 6,366,879 B1 | 4/2002 | Coxhead et al. |
| 6,374,260 B1 | 4/2002 | Hoffert et al. |
| 6,389,400 B1 * | 5/2002 | Bushey et al. ............... 705/7 |
| 6,389,403 B1 | 5/2002 | Dorak, Jr. et al. |
| 6,389,538 B1 | 5/2002 | Gruse et al. |
| 6,400,807 B1 | 6/2002 | Hewitt et al. |
| 6,405,149 B1 | 6/2002 | Tsai et al. |
| 6,405,159 B1 | 6/2002 | Bushey et al. |
| 6,405,170 B1 | 6/2002 | Phillips et al. |
| 6,411,687 B1 | 6/2002 | Bohacek et al. |
| 6,418,216 B1 | 7/2002 | Harrison et al. |
| 6,434,714 B1 | 8/2002 | Lewis et al. |
| 6,448,980 B1 | 9/2002 | Kumar et al. |
| 6,456,619 B1 | 9/2002 | Sassin et al. |
| 6,456,699 B1 | 9/2002 | Burg et al. |
| 6,483,523 B1 | 11/2002 | Feng |
| 6,487,277 B1 | 11/2002 | Beyda et al. |
| 6,516,051 B1 | 2/2003 | Sanders |
| 6,539,080 B1 | 3/2003 | Bruce et al. |
| 6,564,197 B1 | 5/2003 | Sahami et al. |
| 6,598,022 B1 | 7/2003 | Yuschik |
| 6,654,447 B1 | 11/2003 | Dewan |
| 6,658,389 B1 | 12/2003 | Alpdemir |
| 6,681,010 B1 * | 1/2004 | Anderson et al. ...... 379/265.11 |
| 6,694,482 B1 | 2/2004 | Arellano et al. |
| 6,704,396 B1 | 3/2004 | Parolker |
| 2001/0014863 A1 | 8/2001 | Williams, III |
| 2001/0041562 A1 | 11/2001 | Elsey et al. |
| 2002/0055868 A1 | 5/2002 | Dusevic et al. |

| | | | |
|---|---|---|---|
| 2002/0133394 | A1 | 9/2002 | Bushey et al. |
| 2002/0196277 | A1 | 12/2002 | Bushet et al. |
| 2003/0026409 | A1 | 2/2003 | Bushey et al. |
| 2003/0143981 | A1 | 7/2003 | Kortum et al. |
| 2003/0156133 | A1 | 8/2003 | Martin et al. |
| 2003/0156706 | A1 | 8/2003 | Koehler et al. |
| 2003/0158655 | A1 | 8/2003 | Obradovich et al. |
| 2003/0177017 | A1* | 9/2003 | Boyer et al. .................. 705/1 |
| 2004/0006473 | A1 | 1/2004 | Mills et al. |
| 2004/0032935 | A1 | 2/2004 | Mills et al. |
| 2004/0042592 | A1 | 3/2004 | Knott et al. |
| 2004/0143484 | A1* | 7/2004 | Kapadia et al. ............... 705/10 |
| 2004/0213400 | A1* | 10/2004 | Golitsin et al. ........ 379/265.12 |
| 2004/0240635 | A1 | 12/2004 | Bushey et al. |
| 2005/0111653 | A1* | 5/2005 | Joyce et al. ........... 379/265.09 |

FOREIGN PATENT DOCUMENTS

WO        00/73968        12/2000

OTHER PUBLICATIONS

B. Carpenter et al., "Natural Language Call Routing : a Robust, Self-Organising Approach," *Lucent Technologies Bell Laboratories*, 1998.

Press release dated Dec. 3, 1997, "Lucent Technologies Announces Trial of Natural Language Call Routing Technology".

G. Riccardi et al., "A Spoken Language System for Automated Call Routing," 1997 *IEEE International Conference on Acoustics, Speech, and Signal*.

Kelly, "From Intelligent Call Routing to Intelligent Contact Managament," *Call Center Solutions*, vol. 19, No. 3, Sep. 2000, 4 pages.

"Call Center Roundup," *Teleconnect*, Dec. 1998, 10 pages.

"Call Centers: Sales, Service and Competitive Advantage," *Canadian Business*, vol. 70, No. 2, Feb. 1997, 8 pages.

Foster, "Advanced Definity Call Centers: Working for You and Your Customers," *AT&T Technology*, vol. 9, No. 2, Summer 1994, 7 pages.

S. K. Card et al., *The Psychology of Human-Computer Interaction*, Hillsdale, NJ: Lawrence Erlbaum, 1983.

Hart, S.G.; and Staveland, L.E. (1988). *Development of the NASA-TLX (Task Load Index): Results of Empirical and Theoretical Research*. In P.A. Hancock and N. Meshkati (Eds.), *Human Mental Workload*. (pp. 139-183).

John, B.E.; and Kieras, D.E. (1996). Using GOMS for User Interface Design and Evaluation: Which technique? *ACM Transactions on Computer-Human Interaction*, 3 (4). 287-319.

Shingledecker, C.A. (1980). Operator Strategy: A Neglected Variable in Workload Assessment. *The American Psychological Association, Division 21 Symposium on "Metal Workload Measurement: The Theory Application Interface."* Montreal, Quebec, Canada: American Psychological Association.

Wei, Z.G. (1997). *Mental Load and Performance at Different Automation Levels*. The Netherlands: Delft University. Applicants particularly call the Examiner's attention to pp. 28-38 of this document.

Wierwille, W.W. and Eggemeier, F.T. (1993). Recommendations for Mental Workload Measurement in a Test and Evaluation Environment. *Human Factors*, 35 (2), 263-281.

Ameritech Corp., "Ameritech Phone-Based UI Standards: Dialogue Design," <http://www.ameritech.com/corporate/testtown/library/standard/pbix4.html>, 1998.

InterVoiceBrite, Inc., "AgentConnect Call Center Platform Brochure," no date available.

ACD Learning Center Tutorial Series, ACD Call Center Online Learning Center, http://www.call-center.net/ivr-series.htm.

"Customer Management Technology", TeleTech, <http://www.teletech.com/solutions/cmt.htm>, printed on Dec. 18, 2001.

"Products & Services—Interactive Voice Response (IVR)," Prairie Systems, http://www.prairiesys.com/PSI/p_s_interactive_sol.htm.

"RVS Voice," iMessaging Systems, Inc., http://www.imessagingsystems.com/imsprods/rvsvoice/rvsvoice.htm.

"What's Next in Interactive Voice Response," International Nortel Networks Meridian Users Group, <http://www.innmug.org/information/kirvan.html>, InnTouch, Dec., 2000.

K. Kobayashi, "Information Presentation based on Individual User Interests," Second International Conference, IEEE, Apr. 1998, pp. 375-383.

N. Sgouros, Dynamic Dramatization of Multimedia Story Presentations, 1997 ACM, pp. 87-94.

M. Murtaugh, "The Automatist Storytelling System," 1996 Massachusetts Institute of Technology, Masters Thesis.

K. M. Brooks, "Do Story Agents Use Rocking Chars: The Theory and Implementation of One Model for Computational Narrative," Proceedings of the Fourth ACM International Multimedia conference on Intelligent User Interfaces, ACM Press 1996.

P. Szekely, "Retrospective and Challenges for Model-Based Interface Development," USC Information Sciences Institute, 1996.

M. Maybury, "Automating the Generation of Coordinated Multimedia Explanations," Intelligent Multi-Media Interfaces, AAAI/MIT Press, Cambridge, MA, 1993, Chapter 5: S.K. Fiener et al.

C. Stanfill et al., "Toward Memory-Based Reasoning", Communications of the ACM, vol. 29, No. 12, ACM Press, Dec., 1986.

J. Orwant, "Doppelgänger Goes To School: Machine Learning for User Modeling", MIT MS Thesis Sep., 1993.

J. Orwant, "For want of a bit the user was lost: Cheap user modeling", IBM Systems Journal, vol. 35, Nos. 3 & 4, pp. 398-416, 1996.

U. Shardanand, "Social Information Filtering for Music Recommendation," MIT MS Thesis, Sep. 1994.

P. Maes, "From Animals to Animats 2: Proceedings of the Second International Conference on Simulation of Adaptive Behavior, Behavior Based Artificial Intelligence," MIT Media Laboratory 1992.

Henry Lieberman et al., Let's Browse: A Collaborative Web Browsing Agent, Jan. 5-8, 1999, Proceedings of IUI 99, CPP Conference Paper, 5 pages.

Wilson, Designing for Usability. Don't Forget the Power User, Usability Interface—Oct. 1997; retrieved from the Internet on Sep. 9, 2005 at URL: stcsig.org/usability/newsletter/9710-power-user.html .

Cortes, Designing Graphical User Interface, Medical Computing Today, May 1997; retrieved from the Internet on Sep. 9, 2005 at URL: medicalcomputingtoday.com/0agui.html.

Vouri et al., Chapter 12, Developing of Future User Interfaces, Smart Machines and Systems 2010 Technology Programme 1997-2000.

* cited by examiner

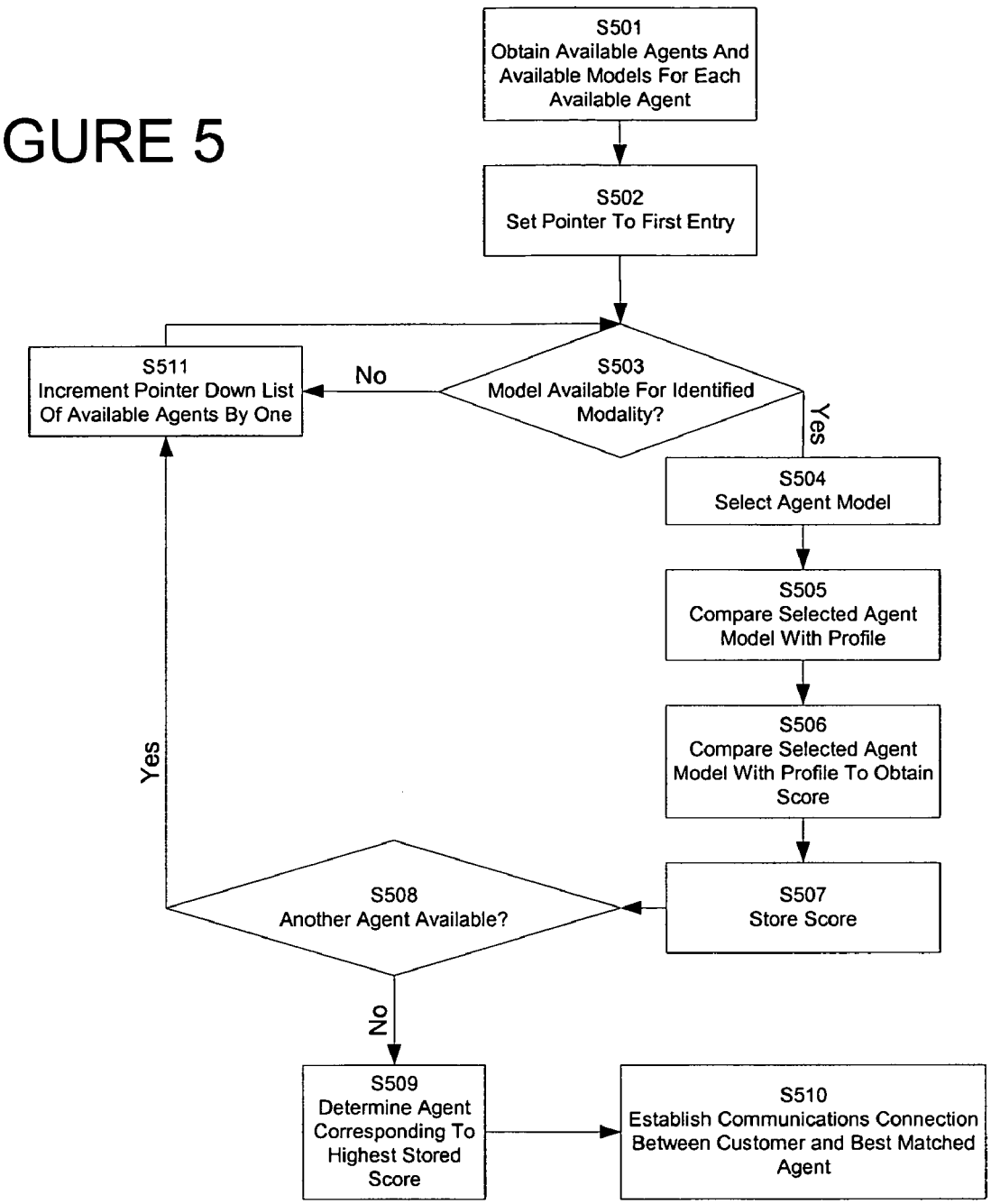

INTELLIGENTLY ROUTING CUSTOMER COMMUNICATIONS

CROSS REFERENCE TO RELATED APPLICATIONS

The present application relates to U.S. Pat. No. 6,389,400 to BUSHEY et al., issued May 14, 2002, and entitled "System and Method for Intelligent Routing of Customer Requests Using Customer and Agent Models", the disclosure of which is expressly incorporated by reference herein in its entirety.

The present application also relates to U.S. Pat. No. 6,405,159 to BUSHEY et al., issued Jun. 11, 2002, and entitled "A Method for Categorizing, Describing and Modeling Types of System Users", the disclosure of which is expressly incorporated by reference herein in its entirety.

BACKGROUND OF THE INVENTION

1. Field of the Invention

The present invention relates to communications routing. More particularly, the present invention relates to routing communications from customers to agents of a service center.

2. Background Information

A need exists for businesses to provide services and/or products to clients and customers who use a variety of communications modalities to contact a multi-modal service center. A conventional service center provides services and/or products to clients and customers who contact the service center using a conventional telephone. As a result, a business may not be providing services and/or products to the full potential range of clients and customers. For example, a client or customer may wish to contact a service center via the internet. Accordingly, there is a need to provide multi-modal service centers that can be contacted via multiple communications modalities by clients and customers. Additionally, there is a need to provide multi-modal agents that can receive and process requests from clients and customers.

Furthermore, a need exists to model agents and to provide a different agent model for each communications modality with which a multi-modal agent can receive requests. A conventional service center may process telephone requests by routing the client or customer to a best-matched agent. In particular, a profile of the client or customer may be used to create a model of the client or customer before routing the client or customer communications to an agent. Additionally, agent models may be created based on characteristics of the agent. Models of available agents may be compared with the model of the client or customer to determine a best-matched agent. However, models have conventionally been used to route calls for clients or customers using conventional telephones to contact an agent using a conventional telephone or telephone headset at the service center. A multi-modal service center, that can receive and process requests from clients or customers using multiple communications modalities, needs to recognize the differences in an agent's capability to receive and process requests for different modalities. Accordingly, there is a need for a multi-modal service center to incorporate into the modeling the differences in the modalities with which the service center can be contacted. Furthermore, there is a need to incorporate into the modeling the differences in the modalities with which a single agent can be contacted.

Additionally, a need exists to model automated agents that are provided at a multi-modal service center. A conventional service center processes requests by routing the requests to a human agent. However, using the different modalities available today, a product and/or service may be provided by a service center using an automated self-service agent application, an automated agent application employing speech recognition technology, or any other automated agent application. Accordingly, there is a need to provide the automated agent applications, and to model the automated agent applications for consideration when routing client and customer communications to a best matched agent using customer/client profiling and agent modeling.

Accordingly, a need exists for a service center to receive client and/or customer requests of a variety of modalities. Moreover, a need exists to identify a modality of the requested communications. Furthermore, a need exists to select agent models based upon an identified modality of the requested communications. Moreover, a need exists to compare the selected agent models with the customer profile so that a best matched agent can be determined. Additionally, a need exists to model automated agents for inclusion in the matching process at a multi-modal service center.

To solve the above-described problems, a system is provided for intelligently routing customer communications to an agent.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawing, and in which:

FIG. 5 is an exemplary flow diagram showing a method for selecting a best-matched agent using an intelligent routing system, according to an aspect of the present invention.

DETAILED DESCRIPTION OF THE INVENTION

Figure 1:
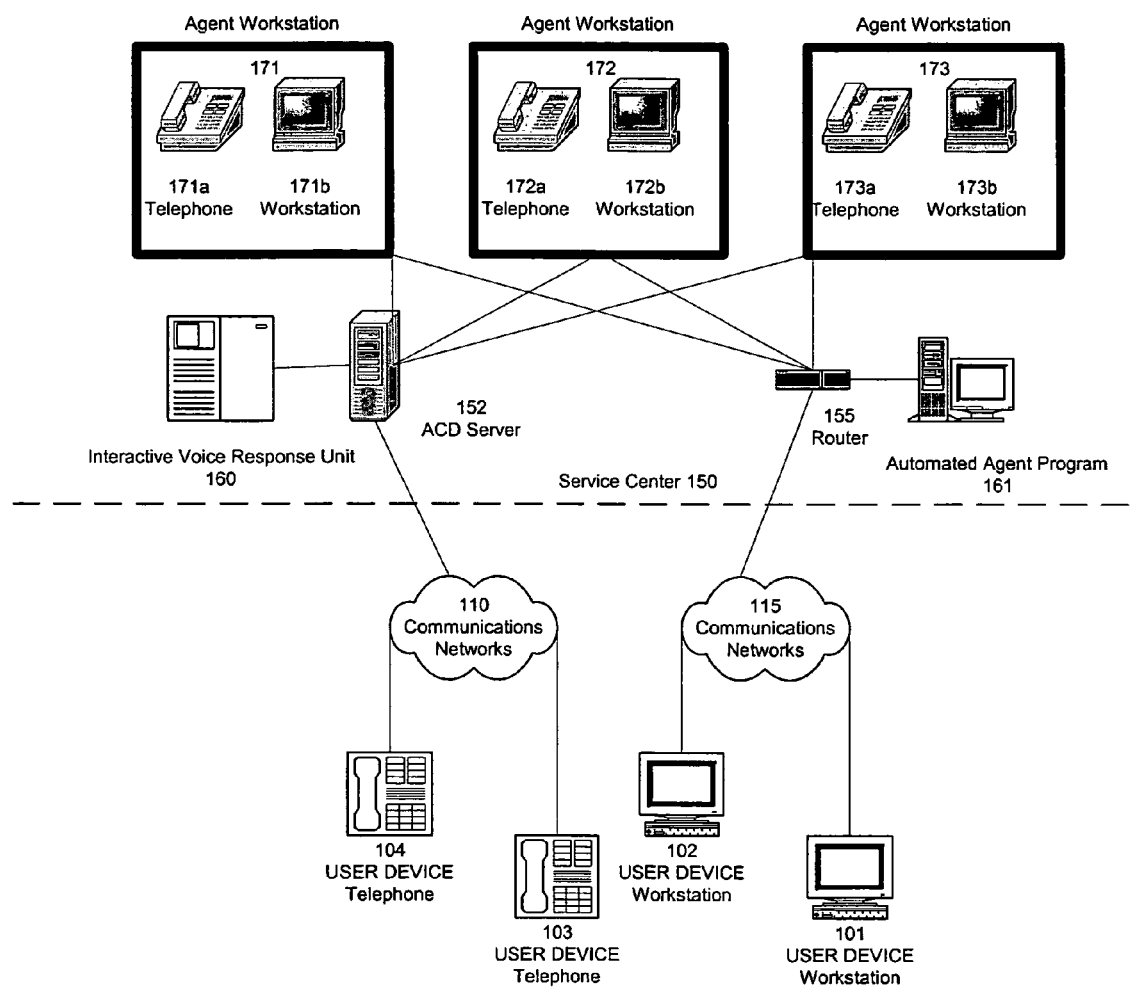
FIG. 1 shows an exemplary telecommunications network architecture, according to an aspect of the present invention.

In view of the foregoing, the present invention, through one or more of its various aspects, embodiments and/or specific features or sub-components, is thus intended to bring out one or more of the advantages as specifically noted below.

According to an aspect of the present invention, a method is provided for intelligently routing customer communications to an agent. The method includes receiving a customer's request to initiate communications and identifying a modality of the requested communications. A profile of the customer is obtained. An agent model is selected for each of a group of agents, based upon the identified modality. The profile is compared with the selected model for each of the agents to determine a best match. A communications connection is established between the customer and the best matched agent.

According to another aspect of the present invention, the modality is a communication mode used by the customer to communicate. According to a further aspect of the present invention, the communication mode is a telephone mode, an internet mode, a voice over internet protocol mode or a text message mode. The text message mode is an instant message mode or an email mode. According to yet another aspect of the present invention, the best matched agent is a queue, an automated self-service application or an automated application employing speech recognition.

According to still another aspect of the present invention, the profile of the customer includes information identifying the customer and information identifying previous interaction between the customer and at least one of the group of agents.

According to another aspect of the present invention, the profile of the customer includes information provided for the requested communications by at least one of the customer and a device used by the customer.

According to a further aspect of the present invention, the agent models for each agent include a set of weighted parameters that are used to generate a score. At least one of the weighted parameters has a different value for different agent models.

According to an aspect of the present invention, an apparatus is provided for intelligently routing customer communications to an agent in a telecommunications environment. The apparatus includes at least one processor that receives a customer's request to initiate communications. The apparatus identifies a modality of the requested communications. A profile of the customer is obtained. The apparatus selects an agent model for each of a group of agents, based upon the identified modality. The profile is compared with the selected model for each of the group of agents to determine a best match. The apparatus establishes a communications connection between the customer and the best matched agent.

According to another aspect of the present invention, the modality is a communication mode used by the customer to communicate. According to yet another aspect of the present invention, the communication mode is a telephone mode, an internet mode, a voice over internet protocol mode or a text message mode. The text message mode is an instant message mode or an email mode.

According to a further aspect of the present invention, the best matched agent is a queue, an automated self-service application or an automated application employing speech recognition.

According to yet another aspect of the present invention, the profile of the customer includes information identifying the customer and information identifying previous interaction between the customer and at least one of the group of agents.

According to still another aspect of the present invention, the profile of the customer includes information provided for the requested communications by at least one of the customer and a device used by the customer.

According to another aspect of the present invention, the agent models for each agent include a set of weighted parameters that are used to generate a score. At least one of the weighted parameters has a different value for different agent models.

According to an aspect of the present invention, a computer readable medium is provided for storing a program for intelligently routing customer communications to an agent. The computer readable medium includes a request receiving source code segment that receives a customer's request to initiate communications. Additionally, the computer readable medium includes a modality identifying source code segment that identifies a modality of the requested communications. A profile obtaining source code segment that obtains a profile of the customer is also included. The computer readable medium also includes an agent model selecting source code segment that selects an agent model for each of a group of agents, based upon the identified modality. A comparison source code segment is provided to compare the profile with the selected model for each of the group of agents to determine a best match. A communications connection is established between the customer and the best matched agent.

According to another aspect of the present invention, the modality is a communication mode used by the customer to communicate. According to a further aspect of the present invention, the communication mode is a telephone mode, an internet mode, a voice over internet protocol mode or a text message mode. The text message mode is an instant message mode or an email mode.

According to yet another aspect of the present invention, the best matched agent is a queue, an automated self-service application or an automated application employing speech recognition. According to still another aspect of the present invention, the profile of the customer includes information identifying the customer and information identifying previous interaction between the customer and at least one of the group of agents.

According to still another aspect of the present invention, the profile of the customer includes information provided for the requested communications by at least one of the customer and a device used by the customer. According to another aspect of the present invention, the agent models for each agent include a set of weighted parameters that are used to generate a score. At least one of the weighted parameters has a different value for different agent models.

A system for intelligently routing customer communications is provided for a multi-modal service center to ensure that the communications are directed to a best-matched available agent. A customer may be an established customer, a new customer, or a client of the company providing the service center. The system receives a request to initiate communications. The request may be a communication of any modality serviceable by agents of the service center. The service center identifies a modality of the requested communication and uses the identified modality to select an agent model for each of a group of appropriate available agents. The selected agent models are compared with a profile of the customer to determine a best match. The request is forwarded to the best matched agent for processing.

An agent at the service center may be capable of receiving and processing communications of one modality but not another. For example, an automated software agent may be capable of interacting with customers communicating using the internet, but not customers communicating using the PSTN. Additionally, a customer, e.g., who downloads a web page from an automated agent using the internet, may not be able to communicate by voice with a human agent. However, when an automated or human agent is capable of receiving and processing communications of multiple modalities, a unique agent model is created for each of the modalities.

Communications may differ by modality. A modality may be distinguished by the network used to carry a communication. For example, a modality may be distinguished by the carrier frequencies used to carry the communication. A modality may also be distinguished by a protocol used to format the information. Additionally, a modality may be distinguished by the ability of a particular recipient to process the communication. As an example, a DTMF signal that is processed by an interactive voice response unit is distinguished from voice signals by a set of frequencies used to define each DTMF signal. The DTMF signals may be meaningfully interpreted by, e.g., an interactive voice response unit agent, but not by a human agent.

A modality may also be distinguished by a programming language used to write the information contained in the communication. Moreover, a modality may be distinguished by the ability to associate with communications and information of a secondary modality. For example, a digital sound or graphic file may be attached to or linked in an email, but not a telephone call.

Furthermore, a conventional telephone call modality is distinguished from a voice over internet protocol (VoIP) call modality or a multi-protocol label switching (MPLS) call modality. In particular, a voice over internet protocol call or a multi-protocol label switching call may include packets of voice samples that need to be depacketized at a service center, whereas a conventional telephone call is normally based on the sequential transmission and receipt of individual voice samples. As another example, an instant message (IM) communication is distinguished from an email communication. A communication with graphical information may be distinguished by a format of digital photograph information or other graphic information carried in the communication.

An agent may be better suited to process communications of one modality than another. Accordingly, the agent models that are created for each modality can distinguish the abilities of an agent to process communications of different modalities.

FIG. 1 shows an exemplary service architecture of the telecommunications system of the present invention. As shown, a user device 101 and a user device 102 are connected to a communications network 115. Either or both of the user devices 101, 102 may be a personal computer, a handheld computer, a desktop computer, a laptop computer, a notebook computer, a mini computer, a workstation, a mainframe computer, a mobile web browser, or a personal digital assistant. The user devices noted herein are used as non-limiting examples; however, with reference to the exemplary embodiment of FIG. 1, the user devices 101, 102 refer to any device with a processor or microprocessor that permits access to a communications network.

The communications network 115 may include, e.g., the internet, a satellite communications network, a broadband cable network, a local area network (LAN), a wide area network (WAN), and/or a wireless local area network (WiLAN). The networks noted herein are used as non-limiting examples; however, with reference to the exemplary embodiment of FIG. 1 the terms "network" and "networks" refer to any combination of networks that provide a medium for transmitting communications between a processor-based user device and a service center agent.

Additionally, a user device 103 and a user device 104 are connected to a communications network 110. By way of example, either or both of the user devices 103, 104 may be a conventional landline telephone, a wireless handset, a portable telephone connected to a base station, an internet-enabled smart telephone, and/or any other device that enables audio communication over dedicated network links. The communications network 110 may include the public switched telephone network (PSTN), an advanced intelligent network (AIN), a personal communications service (PCS) network, a code division multiple access (CDMA) network, a time division multiple access (TDMA) network, a global system mobile (GSM) network, a virtual private network (VPN) that provides secure and encrypted communications between nodes of a broader network, a wireless telephone network and/or any network or combination of networks that provide a medium for transmitting audio communications between a customer device and a service center agent.

The elements above the dashed line denote components of a service center 150. The service center 150 includes an ACD server 152 that routes, e.g., telephone calls to agents of the service center 150. Additionally, the service center 150 includes a router 155 that routes packetized data to agents of the service center 150.

In the embodiment of FIG. 1, the link from the communications network 110 to the service center 150 is a landline PSTN link that carries audio communications. Additionally, the link from the communications network 115 to the service center 150 is a broadband cable connection.

Exemplary agents include an interactive voice response (IVR) unit 160. An IVR is an automated agent application that collects data from a customer using, e.g., speech recognition or dual tone multi-frequency (DTMF) signals. The interactive voice response unit 160 is programmed to follow a script to collect information from a telephone customer. The script may vary according to the information provided by the customer. Additionally, the interactive voice response unit 160 may be programmed to retrieve and provide information to a customer based upon the information provided by the customer. The retrieved information may relate to products or services in regards to which customers may inquire.

An agent may also be a human agent provided at each agent workstation 171, 172 and 173. Each human agent may be provided with, e.g., a corresponding telephone 171a, 172a, 173a connected to the ACD server 152. Each human agent may also be provided with, e.g., a corresponding workstation 171b, 172b, 173b connected to the router 155. As an example, the workstations may include an internet browser program that enables communications using an internet network. Accordingly, the human agents 171, 172, 173 are each capable of communicating using multiple communications modalities.

Additionally, an agent may be an automated agent program 161 executed by a processor contained in a device connected to the router 155. An automated agent program may be, e.g., a web service that is accessible on a web page that is downloaded via the world wide web. The automated agent program 161 is a program to collect information from a web customer and/or prompt the customer to provide information to a web user.

Although not shown, each of the agents, i.e., the interactive voice response unit 160, the automated agent program 161 and the human agents using agent workstations 171, 172, 173, may be connected to internal resources such as a database. The internal resources may contain information related to the products and/or services of the service center 150. Using the internal resources, an agent may appropriately respond to customer requests.

Accordingly, the agents of the service center 150 receive customer requests from the ACD server 152 and/or the router 155. The agents of the service center 150 can support multiple communication modalities, such that a full range of customer requests can be received and processed. The customer communications are routed to agents of the service center 150, and the agents use internal resources to respond to customer requests. Furthermore, the customer communications are routed based on a process of matching selected agent models to determine a best-matched agent. Accordingly, the present invention enables intelligent routing of customer communications to a best matched agent of the service center 150, according to the communications modality of the customer communications.

Figure 2:
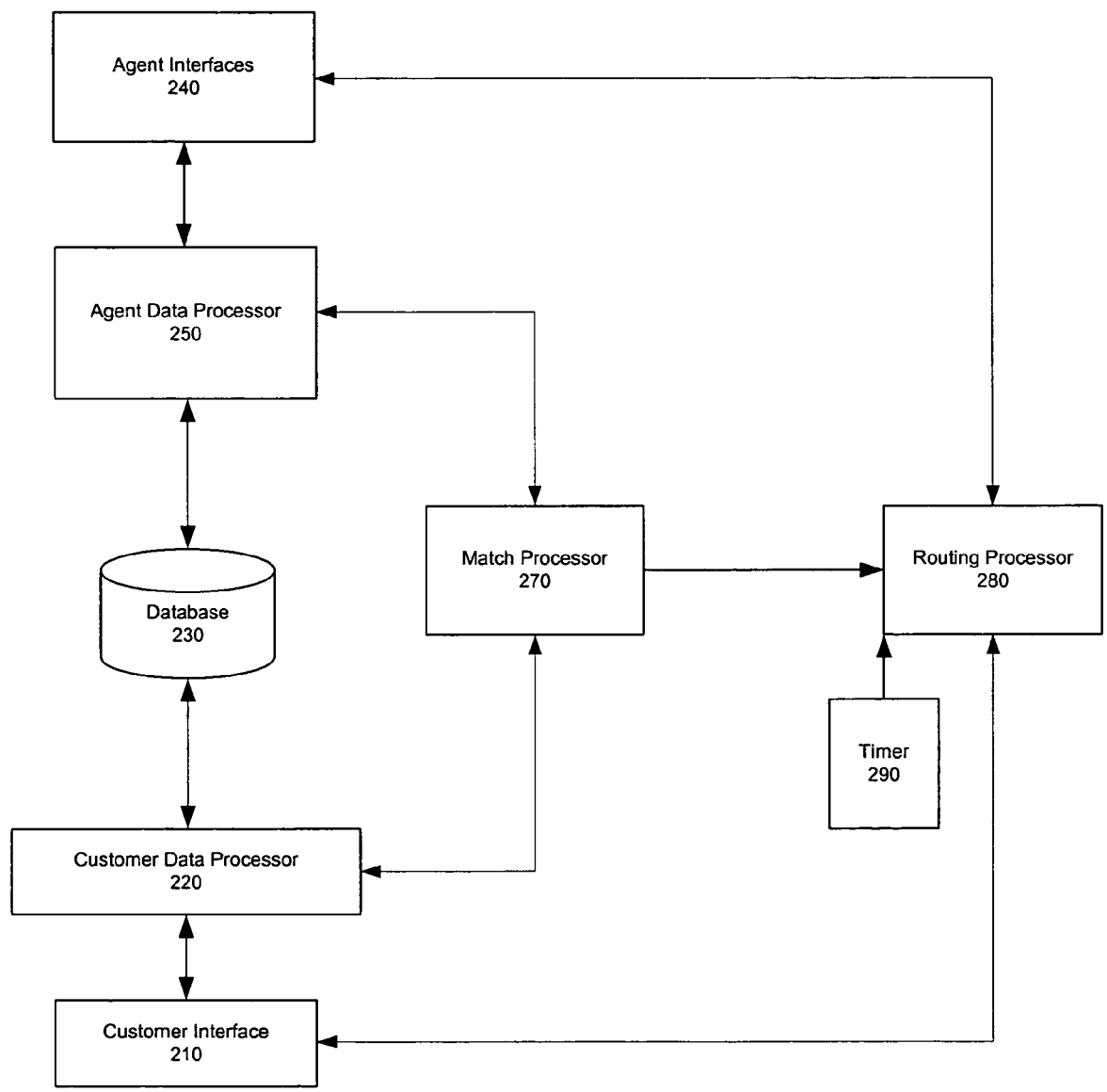
FIG. 2 shows a block diagram of an exemplary intelligent routing system, according to the present invention.

FIG. 2 shows a functional block diagram of an exemplary intelligent routing system according to the present invention. Customers contact the service center 150 to request a service and/or product. Customers contact the service center 150 through a customer interface 210. The customer interface 210 may be provided by, for example, the ACD server 152 or the router 155. The customer interface 210 may be any device and/or software module that receives and processes communications for the service center 150 from the customer. In the example of the router 155, customer communication requests are received as packetized information. Each packet includes "header" information that indicates a modality of the communication. The customer interface 210 allows two-way communication between customers and the service center 150. Therefore, customers can make requests to the service center 150, and the service center 150 can solicit information and/or provide a service to the customers. Of course, the service center 150 may receive useful information, e.g., with the initial request, without needing to specifically solicit a customer.

As an example, a customer interface 210 may be an interactive voice response unit, different from the interactive voice response unit agent 160, that receives telephone calls and interacts with the customer. An interactive voice response unit 210 solicits information from the customer for processing by the intelligent routing system. The interactive voice response unit 210 may automatically receive calls from every telephone customer before the calls are forwarded to the ACD server 152. Alternatively, the interactive voice response unit 210 may automatically receive calls for every telephone customer from the ACD server 152. In either instance, the interactive voice response unit 210 would receive each call in order to screen the customers for information that can be used to help route the call to a best-matched agent. When the interactive voice response unit 210 is done screening the customer, the call is routed to the ACD server 152. The customer's telephone call is intelligently routed by the ACD server 152 to an agent, based on the information collected from the interactive voice response unit 210.

As another alternative, the customer interface 210 may be a software module provided in association with a web page that is downloaded over the internet by the customer. The software module 210 prompts the customer to provide information before being routed to an available agent. The web page may include an option of contacting the service center 150 by email, instant message or any other packetized communications modality with which the service center 150 can be contacted.

The customer interface 210 identifies the modality of the requested communications. For example, the customer interface 210 may determine that a customer is requesting an agent that can receive and process voice over internet protocol speech communications. Alternatively, the customer interface 210 may determine that the customer is requesting an agent that can receive and process markup language text, e.g., a hyper text markup language (HTML) modality or an extensible markup language (XML) modality. As yet another alternative, the customer interface 210 may determine that the customer is requesting communication via an email modality or an instant message modality. The customer interface 210 may determine the communication modality by analyzing information that is received initially with each communication. Alternatively, the customer interface 210 may determine the requisite communication modality by requesting information from the customer, e.g., "press 1 if you are calling from a touch-tone phone".

Once contact has been established between a customer and the service center 150 through the customer interface 210, the customer's information is sent to a customer data processor 220. The customer data processor 220 may then instruct the customer interface 210 to again poll the customer and obtain additional information regarding the customer's identity or request. Information regarding the customer's identity is provided to a database 230 where it is used to search archived historical background information regarding the customer and his/her corresponding account information. The background and account information from the database 230, along with the customer identity and request, are used by the customer data processor 220 to identify and retrieve or compile a customer profile associated with the particular customer.

A customer profile is an information-based numerical model that describes characteristics of a customer. The profile is based on information related to the customer, such as the customer's history of communications with the service center 150, the purpose of the customer's immediate communication, the customer's credit worthiness, and any other information that may be relevant to describing the customer. Many methods may be used to compile a customer's profile. For example, a profile may include scores for multiple descriptive categories, such as customer impatience, or customer willingness to be up-sold or cross-sold additional services and/or products. Of course, the customer profile may also include a single score, for example, when the customer has a consistent pattern of exhibiting behavior that can be described by a single description. The score for each descriptive category may be determined by multiple weighted parameters that are computed and added to achieve the total score for the category. The parameters are based on information obtained from the customer or stored in the database 230 based on previous communications with the customer. Accordingly, a customer profile may include scores for one or more categories that describe the customer. In any case, the customer profile can then be used to match a customer with agent models and to route communications to the agent corresponding to the best matched model.

Agent interfaces 240 allow communications between the agents and the service center 150. The agents may reside at the service center 150, or they may be connected to the service center from a remote location through the agent interfaces 240. As described herein, the agents may be human agents, automated agent programs, interactive voice response unit agents or any other representative device or program that is capable of interacting with a customer. The agent interfaces 240 are similar to the customer interface 210. Information regarding the agents is gathered by the agent data processor 250 through the agent interfaces 240. The agent information relates to identification of each agent and attribute data for each agent.

An agent may support more than one communications modality. Accordingly, attribute information may be segregated to reflect the agent's ability to receive and process communications for each particular communications modality supported by the agent. For example, a human agent may be capable of voice communications over the PSTN, instant messaging sessions and email. Additionally, the human agent may be capable of obtaining and forwarding sound files or digitalized picture and other graphic files via email. Each of the various modes of transmitting and storing information may be considered a different communications modality. An agent's ability to receive and process communications using each modality is used as a basis to generate an agent model. Accordingly, multiple agent models are created for an agent. The agent model for each modality reflects the agent's ability to satisfactorily provide the services of the service center 150.

The agent attribute information gathered by the agent data processor 250 is used to compile the agent models associated with a particular agent. The agent data processor 250 also uses information from all agents to create the agent models. Once a customer makes a request at the service center 150, the agent processor 250 retrieves agent models of the required modality for each available agent from the database 230. A method of compiling agent models is disclosed at, for example, U.S. Pat. No. 6,389,400 to BUSHEY et al., issued May 14, 2002, and entitled "System and Method for Intelligent Routing of Customer Requests Using Customer and Agent Models".

A match processor 270 compares the customer profile with the retrieved agent models. The match processor 270 receives the customer profile from the customer data processor 220 and the agent models from agent data processor 250. The customer profile is matched and compared with each agent model, and a match score is generated for each agent based on the agent model associated with the agent. The match score reflects how well a particular agent may be suited for servicing the customer communication.

A routing processor 280 processes the routing of the customer's request to an agent. The routing processor 280 receives the match scores of each retrieved agent models from the match processor 270. The service center 150 determines a threshold match value that agents must achieve in relation to the requesting customer. The service center 150 may provide different threshold scores for each modality, in recognition of the differences in agent modeling for each modality. The routing processor 280 generates a list of best matched agents that obtain match scores equal to or above the threshold level based on the comparisons of the customer profile with the agent models. The threshold values are set by the service center 150 based on the performance goals of the service center 150.

Initially, the customer request may be routed only to an available agent on the list that has a score equal to or greater than this threshold match value. If the threshold is lowered while the customer request is still pending, additional agents may be added to the list and allowed to service the customer. If the customer has been waiting for too long a time without having been serviced, the list and agent match values may be ignored, and the customer's request may be routed to any available agent.

A timer 290 tracks how long the customer has been waiting after making a request. A variable call wait equation may be used to map the threshold match level against the time elapsed since the customer made the request. The call wait equation is based on the customer profile and the performance goals of the service center 150, and may contain one or multiple threshold levels that vary with the elapsed time. The routing processor 280 may use the timer information and the call wait equation to create the list of best matched agents, modify the list, and route the request. The routing processor 280 monitors the availability of the agents, and routes the customer request to the best matched available agent on the list, as long as the match score is higher than any currently applicable threshold. In a case where no acceptable agents are available for the modality of the customer communications, the intelligent routing system may retrieve models for each agent that supports the particular modality, so that the request will be routed to the first acceptable agent that becomes available. In an embodiment, if a predetermined elapsed time has been reached while waiting for an acceptable agent to become available, the routing processor 280 routes the customer request to any appropriate available agent, even if the match for the available agent does not meet the original threshold for acceptability.

The customer background information, customer profiles, and agent models may reside in the same database or separate databases and still be within the spirit and scope of the present invention. Additionally, a configuration that has all or some of the various processors, 220, 250, 270 and 280, integrated into one or more units is also within the spirit and scope of the present invention.

The customer data processor 220, the database 230, the agent data processor 250, the match processor 270, the routing processor 280 and the timer 290 may be provided in common for multiple customer interfaces 210. For example, in the embodiment of FIG. 1, each of the ACD server 152 and the router 155 may be associated with a different customer interface 210. However, the ACD server 152 and the router 155 may share the use of a single set of the customer data processor 220, database 230, agent data processor 250, match processor 270, routing processor 280 and timer 290. The common architecture enables agent synchronization for multi-modal agents who receive communications of multiple communications modes. For example, a multi-modal agent who receives a first request from one customer interface 210 will be made unavailable to receive a second request from another customer interface 210 until the agent is finished processing the first request.

Figure 3:
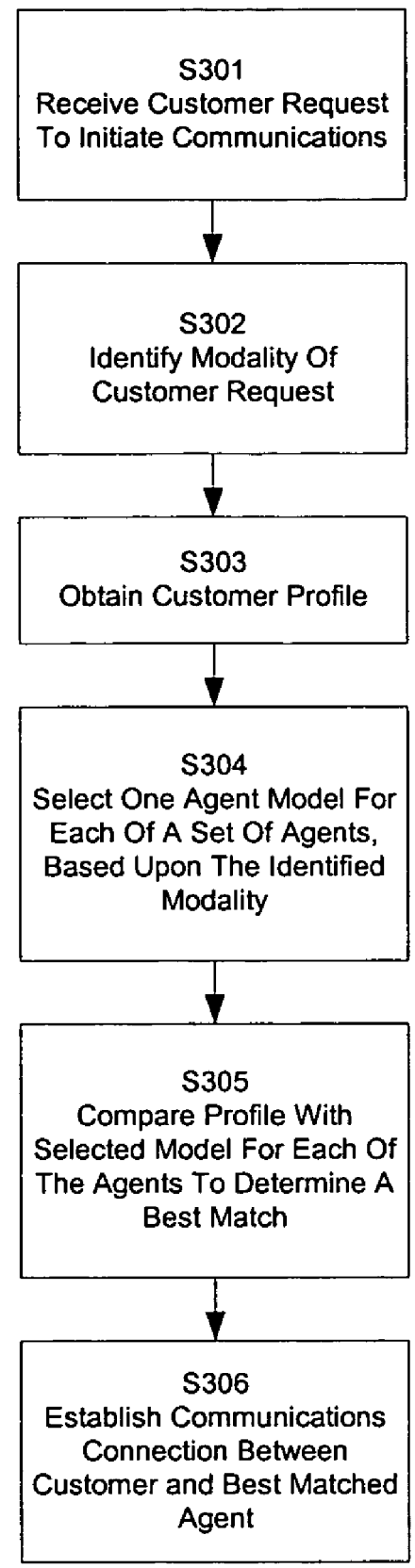
FIG. 3 is an exemplary flow diagram showing a method for routing communications between a customer and a best-matched agent using an intelligent routing system, according to an aspect of the present invention.

FIG. 3 is an exemplary flow diagram showing a method for routing communications between a customer and a best-matched agent using an intelligent routing system. The method starts when a customer request to initiate communications is received at S301. The intelligent routing system determines a modality of the customer request at S302. A customer profile is obtained at S303.

The customer profile may be based on information that is automatically provided with the customer request, e.g., an automatic number identifier/automatic location identifier provided with a telephone call or a return email address provided with an email. Optionally, the customer profile may be obtained using information that is interactively solicited from the customer or a device of the customer. For example, an interactive voice response unit may be used to initially receive telephone calls and solicit input from the customer such as the purpose of the call. Additionally, customer information may be solicited interactively from a smart device using, e.g., a script forwarded to a customer's smart device using a session initiation protocol (SIP) message. A method of interactively forwarding an interactive script to a customer to gather information is described by way of example in U.S. patent application Ser. No. 10/083,472 PAROLKAR, filed Feb. 27, 2002, the content of which is hereby expressly incorporated by reference in its entirety.

At S304, an agent model is selected for each of a set of agents, based upon the identified modality of the customer request. The identified modality may be, for example, the communications mode used by the customer to communicate with the service center 150. However, multiple communications modalities may be relevant to the routing process. For example, a customer may initiate communications by email to request a search and retrieval of photographic files. Accordingly, the best-matched agent may be one with acceptable typing and communications skill, as well as an ability to search for and retrieve photographs using the internet. Therefore, the agent models may be selected based upon more than one relevant communications mode.

The customer profile is compared with the selected model for each agent in the set at S305. A best match is determined from the comparison with the models at S305. The intelligent routing system routes the communications to the best matched available agent at S306.

As was noted previously, the agents may be human or automated. In this regard, automated agents can be included in the set of agents having models for multiple modalities. For example, an interactive voice response unit 160 may be modeled on the same basis as a human agent, e.g. sales results, customer satisfaction, time requirements. As an example, separate models may be created for a DTMF signal modality and a speech recognition modality, each of which may be supported by the interactive voice response unit 160. While human agents would not be modeled for the DTMF modality, both human agents and an interactive voice response unit agent could be modeled for a telephone speech modality. Additionally, the interactive voice response unit agent's models may differ based on, e.g., difficulties in recognizing accented speech that lead to delays not encountered when the agent processes DTMF communications for a particular customer.

Figure 4:
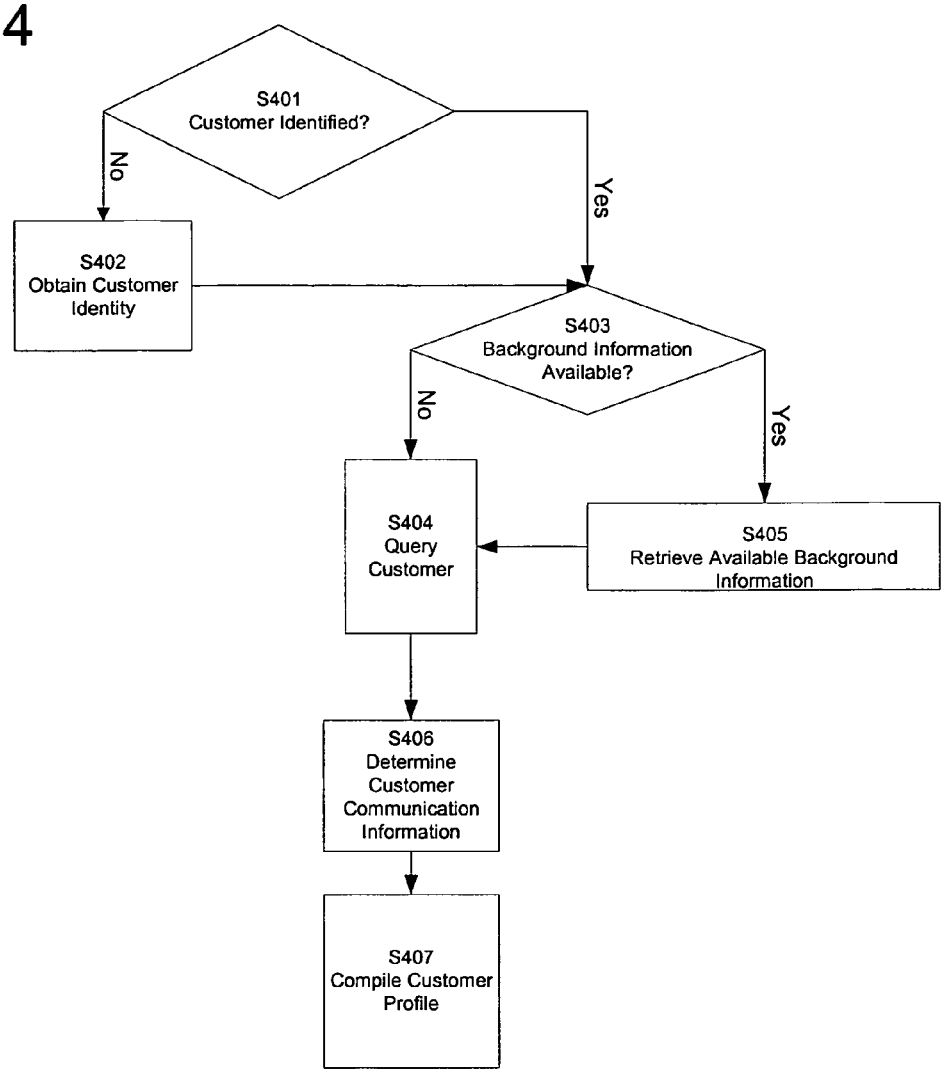
FIG. 4 is an exemplary flow diagram showing a method for compiling a customer profile, according to an aspect of the present invention.

FIG. 4 is an exemplary flow diagram showing a method for compiling a customer profile. At S401, a determination is made whether a customer is identified. A determination that is verified at S401 may be based, for example, on information that is automatically forwarded with the customer's initial request. If the customer is not identified (S401=No), the customer's identify is obtained at S402. The customer's identity may be obtained at S402 by an initial request to the customer for information, such as a request for the customer to provide their home phone number or digits of a social security number.

At S403, a determination is made whether background information is available that corresponds with the customer's identifying information. The background information may be information that can be obtained from the database 230. For example, if the customer had previous interaction with the service center 150, the nature and results of the interaction may have been compiled and stored. After a determination that the background information is not available at S403 (S403=No), the customer is queried at S404 in order to obtain any information necessary to compile a customer profile. When the customer background information is available at S403 (S403=Yes), any necessary background information is retrieved at S405. However, even when the customer background information is available at S403 (S403=Yes), any information to be determined that is not retrieved at S405, is obtained by querying the customer at S404.

The relevant customer communication information is determined at S406. The relevant customer communication information is at least the information that is necessary to compile a customer profile. Of course, the amount and type of information that is necessary will vary according to the goals of each particular service center. At S407, the customer profile is compiled using the customer information that is received from the customer and/or that is retrieved, e.g., from the database 230.

FIG. 5 is an exemplary flow diagram showing a method for selecting a best-matched agent using an intelligent routing system. At S501, information of the available agents and the available models for each available agent are obtained. At S502, a list of the agent and models is created and a pointer is set to point to the first entry (agent) on the list. At S503, a determination is made whether a model is available for the agent corresponding to the entry being considered. In particular, a determination is made whether an agent model exists for the particular modality required by the customer. If an agent model does not exist (S503=No), the pointer is decremented down the list of available agents by one at S511 and the determination at S503 is made for the next agent on the list.

If an agent model is available for the identified modality at S503 (S503=Yes), the agent model is selected at S504 and compared with the customer profile at S505. A score is obtained at S506, based on the comparison of the selected agent model and the customer profile. At S507, the score is stored and, at S508, a determination is made whether another agent model is available on the list. If another agent model is available on the list (S508=Yes), the pointer is decremented down the list of available agents by one at S511 and the determination at S503 is performed.

If another agent model is unavailable at S508 (S508=No), the agent corresponding to the highest score is determined at S509. At S510, a communications connection is established between the customer and the best matched agent.

In another embodiment, a comparison may be made before S510 to determine whether the highest score is higher than a threshold set by the service center. Additionally, if the highest score does not meet the initial threshold, the threshold may be lowered as the communication waits to be routed.

Accordingly, the present invention enables an organization to provide services and/or products to customers who use a variety of communications modalities to contact a multi-modal service center 150. The present invention provides different models for each agent, based upon the capability of the agent to receive and process communications of different modalities. Additionally, the present invention enables a multi-modal service center 150 to use both conventional agents and automated agents, and to optionally route communications to a best matched agent, based upon the modality of the communication used to contact the service center 150.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the interactive voice response unit agent 160 shown in FIG. 1 may be provided at a location external to the service center 150, so long as it receives communications routed from the ACD server 152. Additionally, the Router 155 of FIG. 1 and/or the customer interface 210 of FIG. 2 may be provided as an internal component of the service center 150 or as a component of a communications network 110, 115.

Additionally, the steps shown in the figures may be performed in a different order, or not be performed at all. For example, the process shown in FIG. 4 may skip S404 if sufficient information is obtained based upon the customer's identity at S405. Additional or different steps may also be performed. For example, the process shown in FIG. 4 may retrieve an existing customer profile solely based upon the customer's identity, rather than compiling a "new" customer profile at S407. Accordingly, any method of providing multi-modal agents may fall within the purview of the present invention. Additionally, any method of modeling multi-modal agents, based upon the modalities they support, may fall within the purview of the present invention. Furthermore, any method of providing and modeling automated agent applications for routing communications to a best matched agent at a service center 150 may fall within the purview of the present invention.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the defined networks (e.g. LAN, WAN, WiLAN), packet switched network transmission (e.g., MPLS, VOIP, SIP), and text markup languages (e.g., HTML, XML) represent examples of the state of the art. Such standards are periodically superseded by faster or more efficient equivalents having essentially the same functions. Accordingly, replacement standards and protocols having the same functions are considered equivalents.

What is claimed is:

1. A method for intelligently routing customer communications to an agent, comprising:
   receiving a customer's request to initiate communications;
   identifying a modality of the requested communications;
   obtaining a profile of the customer;
   selecting one of a plurality of agent models for each of a plurality of agents, based upon the identified modality;
   comparing the profile with the selected model for each of the plurality of agents to determine a best match, and establishing a communications connection between the customer and the best matched agent.

2. The method of claim 1, in which the modality comprises a communication mode used by the customer to communicate.

3. The method of claim 2, in which the communication mode comprises one of a telephone mode, an internet mode, a voice over internet protocol mode, and a text message mode, the text message mode comprising one of an instant message mode and an email mode.

4. The method of claim 1, in which the best matched agent comprises one of a queue, an automated self-service application and an automated application employing speech recognition.

5. The method of claim 1, in which the profile of the customer includes information identifying the customer and information identifying previous interaction between the customer and at least one of the plurality of agents.

6. The method of claim 1, in which the profile of the customer includes information provided for the requested communications by at least one of the customer and a device used by the customer.

7. The method of claim 1, in which the plurality of agent models for each agent comprise a set of weighted parameters that are used to generate a score, at least one of the weighted parameters having a different value for different agent models.

8. An apparatus for intelligently routing customer communications to an agent in a telecommunications environment, comprising:
   at least one processor that receives a customer's request to initiate communications, identifies a modality of the requested communications, obtains a profile of the customer, selects one of a plurality of agent models for each of a plurality of agents, based upon the identified modality, compares the profile with the selected model for each of the plurality of agents to determine a best match, and establishes a communications connection between the customer and the best matched agent.

9. The apparatus of claim 8, in which the modality comprises a communication mode used by the customer to communicate.

10. The apparatus of claim 9, in which the communication mode comprises one of a telephone mode, an internet mode, a voice over internet protocol mode, and a text message mode, the text message mode comprising one of an instant message mode and an email mode.

11. The apparatus of claim 8, in which the best matched agent comprises one of a queue, an automated self-service application and an automated application employing speech recognition.

12. The apparatus of claim 8, in which the profile of the customer includes information identifying the customer and information identifying previous interaction between the customer and at least one of the plurality of agents.

13. The apparatus of claim 8, in which the profile of the customer includes information provided for the requested communications by at least one of the customer and a device used by the customer.

14. The apparatus of claim 8, in which the plurality of agent models for each agent comprise a set of weighted parameters that are used to generate a score, at least one of the weighted parameters having a different value for different agent models.

15. A computer readable medium that stores a program for intelligently routing customer communications to an agent, comprising:
- a request receiving code segment that receives a customer's request to initiate communications;
- a modality identifying code segment that identifies a modality of the requested communications;
- a profile obtaining code segment that obtains a profile of the customer;
- an agent model selecting code segment that selects one of a plurality of agent models for each of a plurality of agents, based upon the identified modality;
- a comparison code segment that compares the profile with the selected model for each of the plurality of agents to determine a best match, and establishing a communications connection between the customer and the best matched agent.

16. The computer readable medium of claim 15, in which the modality comprises a communication mode used by the customer to communicate.

17. The computer readable medium of claim 16, in which the communication mode comprises one of a telephone mode, an internet mode, a voice over internet protocol mode, and a text message mode, the text message mode comprising one of an instant message mode and an email mode.

18. The computer readable medium of claim 15, in which the best matched agent comprises one of a queue, an automated self-service application and an automated application employing speech recognition.

19. The computer readable medium of claim 15, in which the profile of the customer includes information identifying the customer and information identifying previous interaction between the customer and at least one of the plurality of agents.

20. The computer readable medium of claim 15, in which the profile of the customer includes information provided for the requested communications by at least one of the customer and a device used by the customer.

21. The computer readable medium of claim 15, in which the plurality of agent models for each agent comprise a set of weighted parameters that are used to generate a score, at least one of the weighted parameters having a different value for different agent models.

\* \* \* \* \*